US011966176B2

(12) United States Patent
Tanaka et al.

(10) Patent No.: US 11,966,176 B2
(45) Date of Patent: Apr. 23, 2024

(54) TRANSFER MEMBER, TRANSFER DRUM, AND IMAGE FORMING APPARATUS

(71) Applicant: FUJIFILM Business Innovation Corp., Tokyo (JP)

(72) Inventors: Hirotaka Tanaka, Ebina (JP); Tomoaki Yoshioka, Ebina (JP); Yoko Miyamoto, Ebina (JP); Toshiaki Baba, Ebina (JP); Koichiro Yuasa, Ebina (JP); Kazuyoshi Hagiwara, Ebina (JP); Kei Tanaka, Ebina (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 77 days.

(21) Appl. No.: 17/530,153

(22) Filed: Nov. 18, 2021

(65) Prior Publication Data

US 2022/0075294 A1 Mar. 10, 2022

Related U.S. Application Data

(63) Continuation of application No. PCT/JP2020/022187, filed on Jun. 4, 2020.

(30) Foreign Application Priority Data

Jul. 19, 2019 (JP) ................................ 2019-133648

(51) Int. Cl.
*G03G 15/16* (2006.01)

(52) U.S. Cl.
CPC ......... *G03G 15/162* (2013.01); *G03G 15/161* (2013.01)

(58) Field of Classification Search
CPC .......................... G03G 15/161; G03G 15/162
See application file for complete search history.

(56) References Cited

U.S. PATENT DOCUMENTS

| | | | | |
|---|---|---|---|---|
| 6,969,543 | B1 | 11/2005 | Aronhime et al. | |
| 7,302,216 | B2 | 11/2007 | Lior et al. | |
| 2001/0032560 | A1 * | 10/2001 | Andrew ................ | B41N 10/06 101/376 |
| 2005/0039619 | A1 | 2/2005 | Invernizzi et al. | |
| 2007/0019997 | A1 | 1/2007 | Lior et al. | |
| 2014/0125004 | A1 | 5/2014 | Maeyama et al. | |
| 2014/0230673 | A1 | 8/2014 | Mor-Yosef et al. | |
| 2022/0075294 | A1 | 3/2022 | Tanaka et al. | |

(Continued)

FOREIGN PATENT DOCUMENTS

| | | |
|---|---|---|
| JP | H11-512190 A | 10/1999 |
| JP | H11-300930 A | 11/1999 |
| JP | 2003-527985 A | 9/2003 |

(Continued)

OTHER PUBLICATIONS

Mar. 14, 2023 Office Action Issued in Japanese Patent Application No. 2019-133648.

(Continued)

*Primary Examiner* — Stephanie E Bloss
*Assistant Examiner* — Michael A Harrison
(74) *Attorney, Agent, or Firm* — Oliff PLC

(57) ABSTRACT

A transfer member includes: an inner layer; and an outer layer that is adhered to the inner layer and has a hardness lower than a hardness of the inner layer.

13 Claims, 7 Drawing Sheets

(56) References Cited

U.S. PATENT DOCUMENTS

2022/0357691 A1 11/2022 Kishi et al.

FOREIGN PATENT DOCUMENTS

| | | | |
|---|---|---|---|
| JP | 2005-254554 | A | 9/2005 |
| JP | 2007-502730 | A | 2/2007 |
| JP | 2008-310362 | A | 12/2008 |
| JP | 2014-095747 | A | 5/2014 |
| JP | 2014-530128 | A | 11/2014 |

OTHER PUBLICATIONS

Jul. 14, 2020 International Search Report issued in International Patent Application No. PCT/JP2020/022187.
Jul. 14, 2020 Written Opinion issued in International Patent Application No. PCT/JP2020/022187.
Jun. 30, 2020 International Search Report issued in International Patent Application No. PCT/JP2020/022002.
Jun. 30, 2020 Written Opinion issued in International Patent Application No. PCT/JP2020/022002.
Nov. 28, 2022 Notice of Allowance issued in U.S. Appl. No. 17/527,886.
Oct. 27, 2023 Office Action issued in Chinese Patent Application No. 202080041707.0.

* cited by examiner

TRANSFER MEMBER, TRANSFER DRUM, AND IMAGE FORMING APPARATUS

CROSS-REFERENCE TO RELATED APPLICATIONS

This is a continuation of International Application No. PCT/JP2020/022187 filed on Jun. 4, 2020, and claims priority from Japanese Patent Application No. 2019-133648 filed on Jul. 19, 2019.

BACKGROUND

Technical Field

The present invention relates to a transfer member, a transfer drum, and an image forming apparatus.

Related Art

As disclosed in Patent Literature 1, an image transfer member including: a conductive layer; a matching layer that is provided on the conductive layer and has electric resistance larger than that of the conductive layer; and a release layer that is provided on the matching layer, has electric resistance larger than that of the matching layer, and is configured to transfer an image is known in related art. The matching layer includes plural sublayers. The plural sublayers include a hard sublayer provided below the release layer and a soft sublayer provided below the hard sublayer.

CITATION LIST

Patent Literature

Patent Literature 1: JP-A-2008-310362

SUMMARY

Aspects of non-limiting embodiments of the present disclosure relate to reducing tension variation in a circumferential direction of an outer layer in a transfer member including an inner layer and the outer layer.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a transfer member including: an inner layer; and an outer layer that is adhered to the inner layer and has a hardness lower than a hardness of the inner layer.

BRIEF DESCRIPTION OF DRAWINGS

Exemplary embodiment(s) of the present invention will be described in detail based on the following figures, wherein.

DETAILED DESCRIPTION

Hereinafter, an exemplary embodiment according to the present invention will be described in detail with reference to the drawings. Hereinafter, an upstream side in a conveying direction of a recording sheet P that serves as an example of a recording medium may be referred to as an "upstream side", and a downstream side in the conveying direction may be referred to as a "downstream side". Similarly, an upstream side in a rotation direction of a transfer drum 50 may be simply referred to as an "upstream side", and a downstream side in the rotation direction may be simply referred to as a "downstream side". A case where the transfer drum 50 is viewed from an axial direction is referred to as a "side view".

Figure 1:
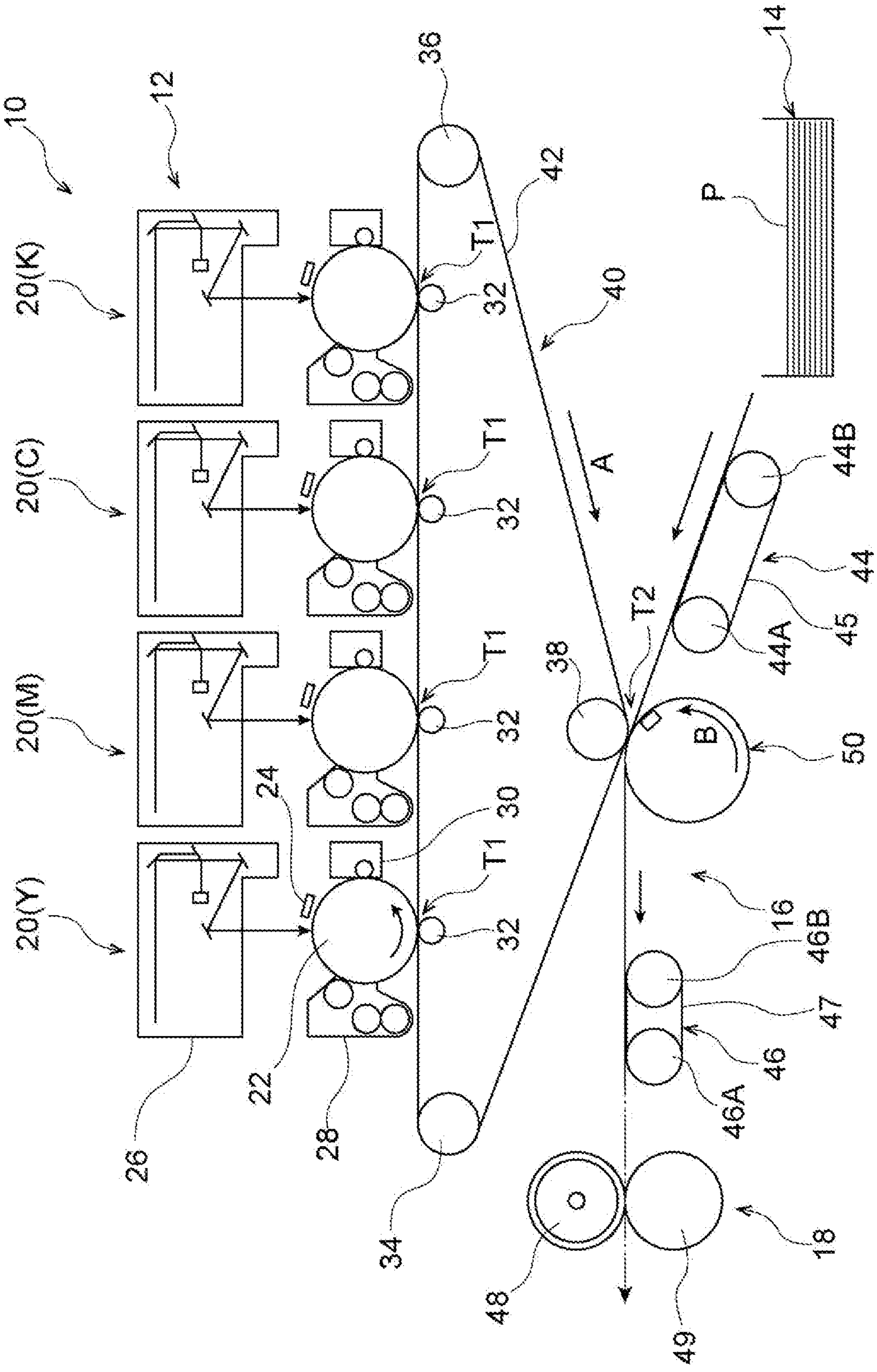
FIG. 1 is a schematic configuration diagram illustrating an image forming apparatus according to an exemplary embodiment.

As illustrated in FIG. 1, an image forming apparatus 10 is an electrophotographic image forming apparatus that forms a toner image (an example of an image) on the recording sheet P, for example. In an apparatus body (not illustrated), the image forming apparatus 10 includes an image forming unit 12, an accommodating unit 14, a conveyance unit 16, and a fixing device 18. Hereinafter, each part (the image forming unit 12, the conveyance unit 16, and the fixing device 18) of the image forming apparatus 10 will be described.

<Image Forming Unit>

The image forming unit 12 has a function of forming a toner image on the recording sheet P. Specifically, the image forming unit 12 includes a toner image forming unit 20 and a transfer device 40.

<Toner Image Forming Unit>

As illustrated in FIG. 1, the toner image forming units 20 are provided so as to form a toner image for each color. In the exemplary embodiment, toner image forming units 20Y, 20M, 20C, and 20K of a total of four colors including yellow (Y), magenta (M), cyan (C), and black (K) are provided.

In the following description, when it is necessary to distinguish the respective colors of yellow (Y), magenta (M), cyan (C), and black (K), letters Y, M, C, and K are attached after reference numerals of respective members, and when it is not necessary to distinguish the respective colors, the letters Y, M, C, and K may be omitted. Since the toner image forming units 20 of the respective colors have the same configuration, in FIG. 1, reference numerals are given to only the respective parts of the yellow toner image forming unit 20Y.

The toner image forming unit 20 of each color includes a photoconductor drum 22 that rotates in one direction (for example, in a counterclockwise direction in FIG. 1). The toner image forming unit 20 of each color includes a charging unit 24, an exposure device 26, a developing device 28, and a removing device 30 in such an order from an upstream side in a rotation direction of the photoconductor drum 22.

In the toner image forming unit 20 of each color, the charging unit 24 charges an outer circumferential surface of the photoconductor drum 22. The exposure device 26 exposes the outer circumferential surface of the photoconductor drum 22 charged by the charging unit 24 to light, so as to form an electrostatic latent image on the outer circumferential surface of the photoconductor drum 22. The developing device 28 develops the electrostatic latent image formed on the outer circumferential surface of the photoconductor drum 22 by the exposure device 26 to form a toner image. The removing device 30 removes toner remaining on the outer circumferential surface of the photoconductor drum 22 after the toner image is transferred to a transfer belt 42 to be described later.

[Transfer Device]

As illustrated in FIG. 1, the transfer device 40 includes a primary transfer roller 32 that serves as an example of a primary transfer body, the transfer belt 42 that serves as an example of an intermediate transfer body, and the transfer drum 50 that serves as an example of a second transfer body. That is, the transfer device 40 primarily transfers the toner image formed on the outer circumferential surface of the photoconductor drum 22 of each color onto the transfer belt 42 in a superimposed manner, and secondarily transfers the superimposed toner image onto the recording sheet P. The transfer drum 50 will be described in detail later.

(Primary Transfer Roller)

As illustrated in FIG. 1, the primary transfer roller 32 transfers the toner image formed on the outer circumferential surface of the photoconductor drum 22 of each color to an outer circumferential surface of the transfer belt 42 at a primary transfer position T1 between the photoconductor drum 22 and the primary transfer roller 32. In the exemplary embodiment, when a primary transfer voltage is applied between the primary transfer roll 32 and the photoconductor drum 22, the toner image formed on the outer circumferential surface of the photoconductor drum 22 is transferred to the outer circumferential surface of the transfer belt 42 at the primary transfer position T1.

(Transfer Belt)

As illustrated in FIG. 1, the transfer belt 42 has an annular shape where the toner image is transferred to the outer circumferential surface, and the transfer belt 42 is wound around a driving roller 34, a tension roller 36, and a backup roller 38 such that a posture thereof is determined. The driving roller 34 is configured to be rotationally driven by a driving unit (not illustrated), and rotates the transfer belt 42 in a direction of arrow A at a predetermined speed.

Figure 2:
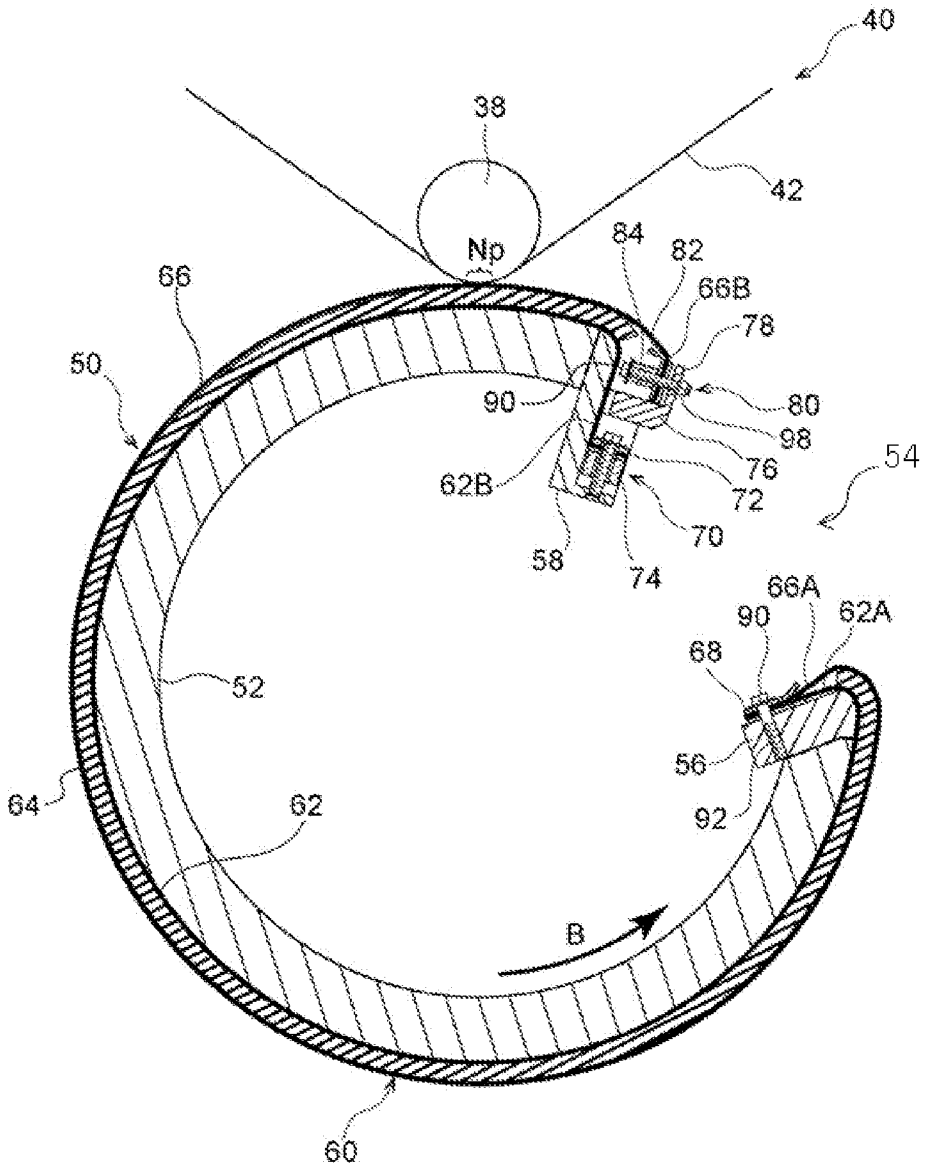
FIG. 2 is a side view illustrating a transfer drum according to the exemplary embodiment.

The backup roller 38 faces the transfer drum 50 to be described later with the transfer belt 42 interposed therebetween. As illustrated in FIG. 2, a contact region where the transfer drum 50 and the transfer belt 42 are in contact with each other, in other words, a region where the recording sheet P is sandwiched between the transfer drum 50 and the transfer belt 42, is a nip region Np. The nip region Np is a secondary transfer position T2 where the toner image is transferred from the transfer belt 42 to the recording sheet P.

<Conveyance Unit>

As illustrated in FIG. 1, the conveyance unit 16 is configured with a first conveyance unit 44 and a second conveyance unit 46. The first conveyance unit 44 is disposed on the upstream side relative to the transfer drum 50, and conveys the recording sheet P sent out from the accommodating unit 14 toward the transfer drum 50. The second conveyance unit 46 is disposed on the downstream side relative to the transfer drum 50, and conveys the recording sheet P, where the toner image is secondarily transferred by passing through the nip region Np that is the secondary transfer position T2, to the fixing device 18.

The first conveyance unit 44 includes a driving roller 44A and a driven roller 44B that are separated from each other in the conveying direction of the recording sheet P, and a conveyance belt 45 that is wound around the driving roller 44A and the driven roller 44B. Similarly, the second conveyance unit 46 includes a driving roller 46A and a driven roller 46B that are separated from each other in the conveying direction of the recording sheet P, and a conveyance belt 47 that is wound around the driving roller 46A and the driven roller 46B.

<Fixing Device>

As illustrated in FIG. 1, the fixing device 18 includes a heating roller 48 that serves as an example of a heating member, and a pressure roller 49 that serves as an example of a pressure member. The fixing device 18 sandwiches the recording sheet P between the heating roller 48 and the pressure roller 49 and heats and presses the recording sheet P so as to fix the toner image transferred to the recording sheet P by the transfer drum 50 on the recording sheet P.

Next, the transfer drum 50 of the image forming apparatus 10 configured as described above will be described in detail.

(Transfer Drum)

Figure 3:
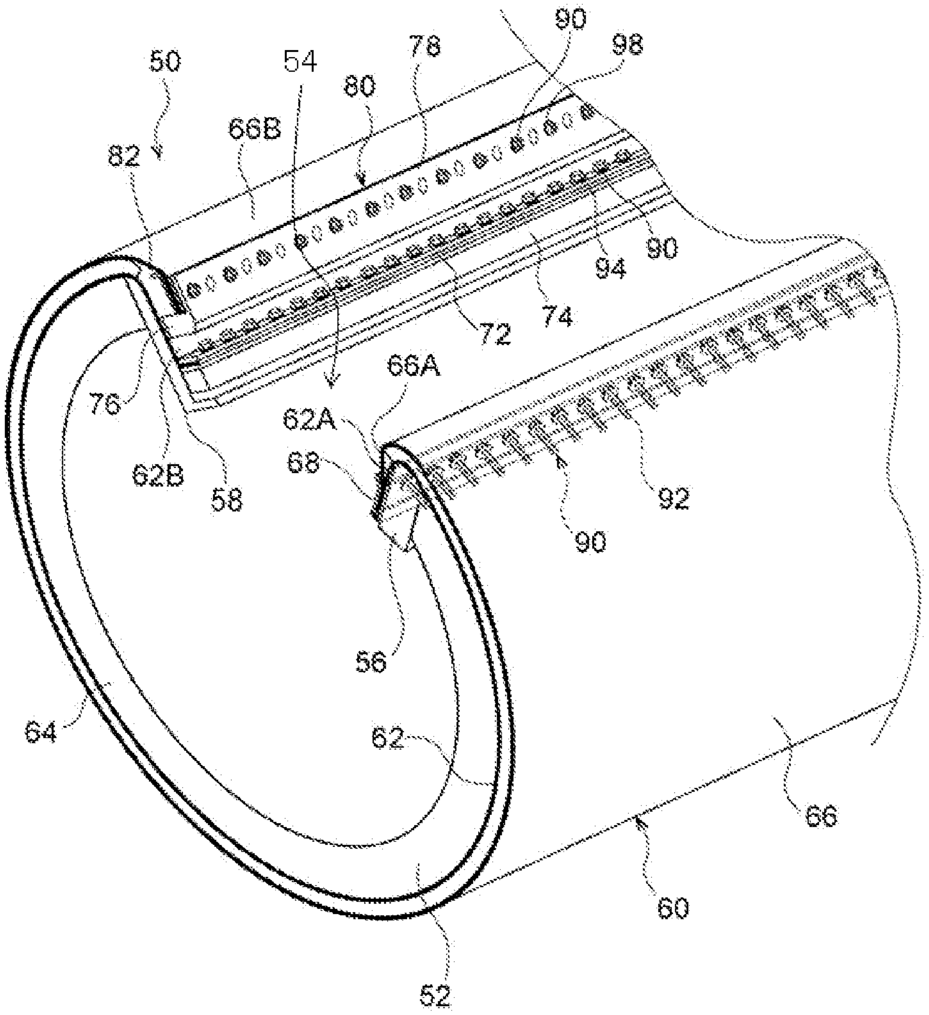
FIG. 3 is a perspective view illustrating the transfer drum according to the exemplary embodiment.

As illustrated in FIGS. 2 and 3, the transfer drum 50 includes a transfer drum body 52 and a transfer member 60 that is wound around the transfer drum body 52. The transfer drum body 52 is formed in a substantially cylindrical shape in which a recess 54, which is a single notch, is formed along the axial direction in a part of an outer circumferential surface thereof. A pair of sprockets (not illustrated) are disposed on both ends in axial directions of the transfer drum body 52.

The transfer drum body 52 that is a part of the transfer drum 50 is rotated in one direction (a direction of arrow B illustrated in FIGS. 1 and 2) by the pair of sprockets being rotationally driven by a driving unit (not illustrated) via a driving force transmission member (not illustrated) such as a chain. In the recess 54, plural grippers (not illustrated) that grip a downstream side tip of the recording sheet P sent from the first conveyance unit 44 outside the region where the toner image is transferred are provided in the axial direction.

Therefore, the transfer drum 50 is rotated while the downstream side tip of the recording sheet P is gripped by the grippers, and thus conveys the recording sheet P to a position between the transfer belt 42 and the transfer drum 50. The transfer drum 50 is configured to apply a secondary transfer voltage while the recording sheet P is sandwiched between a surface of a surface layer 66 to be described later and the outer circumferential surface of the transfer belt 42, so as to transfer the toner image from the transfer belt 42 to the recording sheet P in the nip region Np that is the secondary transfer position T2.

Figure 4:
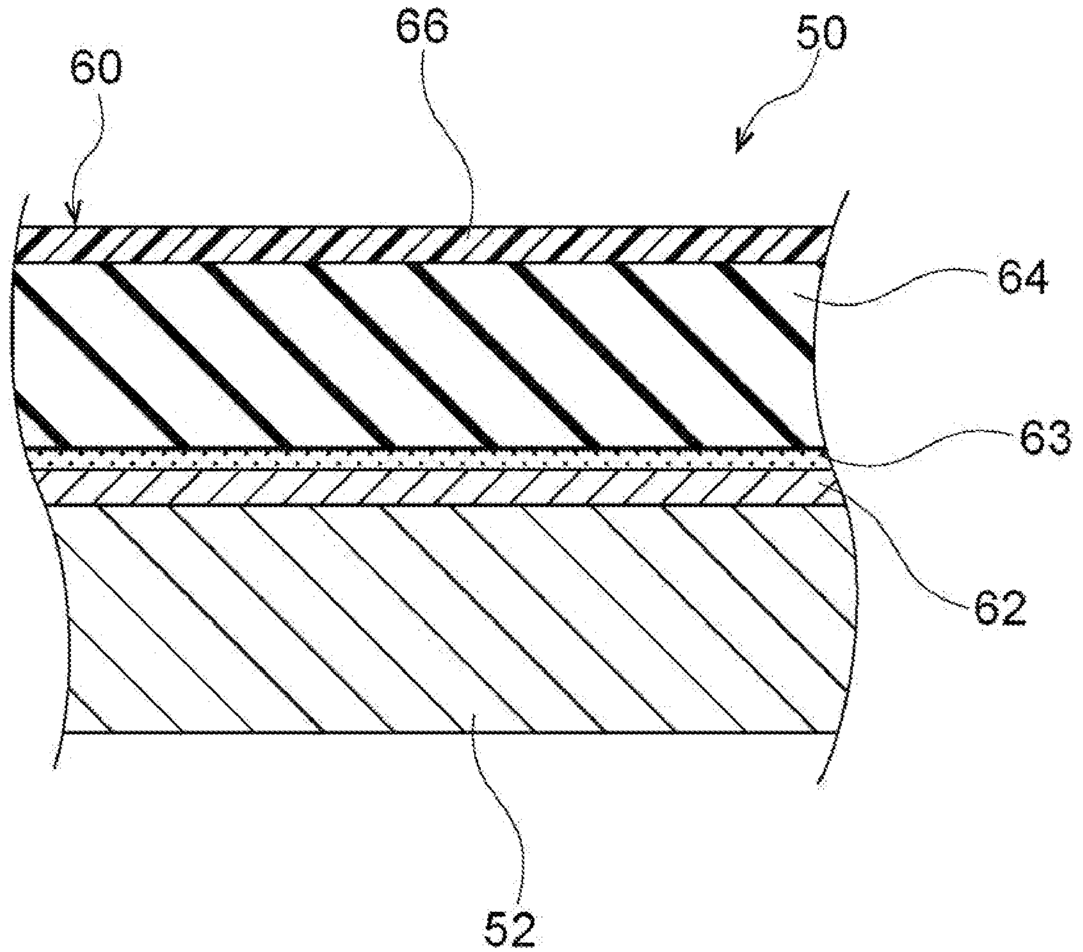
FIG. 4 is a cross-sectional view illustrating a configuration of a transfer member according to the exemplary embodiment.

As illustrated in FIG. 4, the transfer member 60 includes: a base layer 62 that serves as an example of an inner layer wound around the transfer drum body 52 in a non-adhesive manner; an elastic layer 64 that serves as an example of an outer layer wound around an outer circumferential surface of the base layer 62 in a state of being adhered (via an adhesive layer 63); and the surface layer 66 that is wound around an outer circumferential surface of the elastic layer 64 without adhering to the elastic layer 64.

As the base layer 62, a metal layer made of a metal material such as stainless steel, aluminum, or copper is used, and a thickness thereof is, for example, 0.1 mm. The base layer 62 in the exemplary embodiment is made of stainless steel. As the elastic layer 64, a conductive resin material (conductive rubber layer) such as foamed rubber, for example, nitrile rubber, chloroprene rubber, ethylene propylene diene rubber (EPDM), acrylonitrile butadiene rubber (NBR), silicone rubber, polyurethane, polyethylene, or a mixture thereof is used.

Therefore, hardness of the base layer 62 is higher than hardness of the elastic layer 64. That is, the hardness of the elastic layer 64 is lower than the hardness of the base layer 62. Volume resistivity of the base layer 62 is smaller than volume resistivity of the elastic layer 64. The elastic layer 64 in the exemplary embodiment is made of nitrile rubber. The elastic layer 64 is formed to be thicker than the base layer 62 and the surface layer 66, and has a thickness of, for example, 7 mm. As the adhesive layer 63, for example, an acrylic conductive adhesive or the like is used.

As the surface layer 66, for example, a resin material (transfer layer) such as polyimide, polyamide-imide, polycarbonate (PC), polyethylene terephthalate (PET), polyether ether ketone (PEEK), solid rubber, for example, nitrile rubber, chloroprene rubber, ethylene propylene diene rubber (EPDM), acrylonitrile butadiene rubber (NBR), or silicon rubber is used. The surface layer 66 in the exemplary embodiment is made of polyimide. A thickness of the surface layer 66 is, for example, 0.1 mm.

As illustrated in FIG. 2, a circumferential direction length of the elastic layer 64 is substantially the same as a circumferential direction length of the transfer drum body 52 excluding the recess 54 (including radially outer end surfaces of a fixed-side block 56 and a movable-side block 58 to be described later). Circumferential direction lengths of the base layer 62 and the surface layer 66 are longer than the circumferential direction length of the elastic layer 64.

As described above, an inner circumferential surface of the elastic layer 64 is adhered to the outer circumferential surface of the base layer 62 by the adhesive (adhesive layer 63), an inner circumferential surface of the base layer 62 is not adhered to the outer circumferential surface of the transfer drum body 52, and an inner circumferential surface of the surface layer 66 is also not adhered to the outer circumferential surface of the elastic layer 64. That is, the base layer 62 and the surface layer 66 are detachably attached to the transfer drum body 52.

Figure 5:
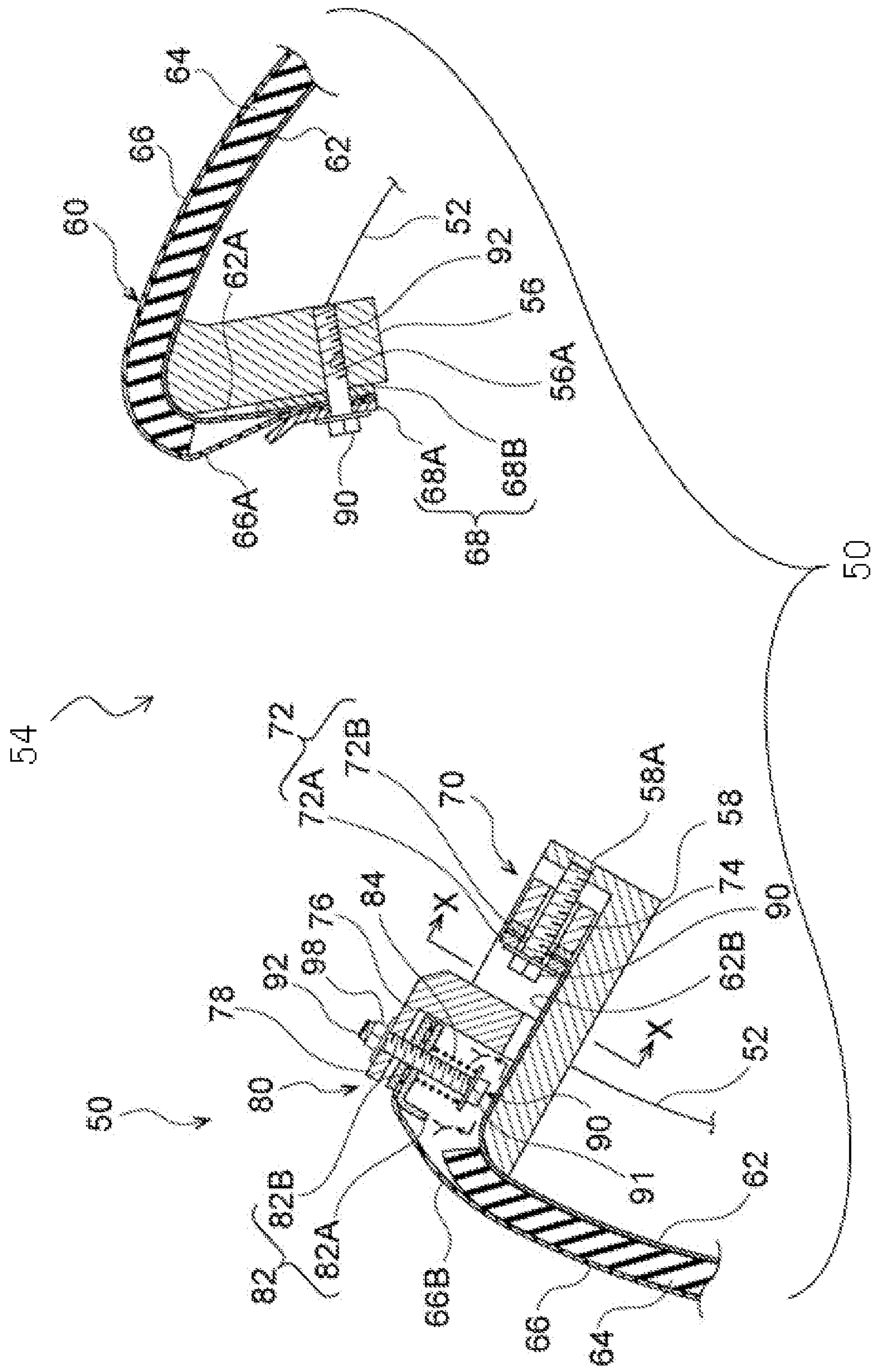
FIG. 5 is an enlarged side view illustrating a configuration of a recess of the transfer drum according to the exemplary embodiment.

More specifically, as illustrated in FIGS. 2, 3, and 5, one end portion in a circumferential direction (downstream end portion) of the base layer 62 is an extension portion 62A that extends further in the circumferential direction from the elastic layer 64. Plural bolt-inserting through holes (not illustrated) are formed at predetermined intervals in the axial direction of the transfer drum body 52 at a tip end of the extension portion 62A.

Similarly, one end portion in a circumferential direction (downstream end portion) of the surface layer 66 is an extension portion 66A that extends further in the circumferential direction from the elastic layer 64. Plural bolt-inserting through holes (not illustrated) are formed at predetermined intervals in the axial direction of the transfer drum body 52 at a tip end of the extension portion 66A.

The fixed-side block 56 that extends toward an approximate center of the transfer drum body 52 (radially inward) in the side view is integrally provided at one side edge portion (on the downstream side) of the recess 54 of the transfer drum body 52. As illustrated in FIG. 5, plural female screw portions 56A are formed in a radially inner end portion of the fixed-side block 56 at predetermined intervals in the axial direction of the transfer drum body 52 with the substantially circumferential direction serving as the axial direction.

Therefore, the extension portion 62A and the extension portion 66A are bolted to the fixed-side block 56 in the following manner. That is, first, the tip end of the extension portion 66A (a portion where the through holes are formed) is overlapped with the tip end of the extension portion 62A (a portion where the through holes are formed). The tip ends of the extension portion 62A and the extension portion 66A that are overlapped with each other are sandwiched between a pair of flat plate members 68. The axial direction of the transfer drum body 52 is a longitudinal direction of each flat plate member 68, and plural bolt-inserting through holes (not illustrated) are formed in each flat plate member 68 at predetermined intervals in the axial direction (longitudinal direction) of the transfer drum body 52.

While the tip ends of the extension portion 62A and the extension portion 66A are both sandwiched between the pair of flat plate members 68, the pair of flat plate members 68 are bolted to the fixed-side block 56. Specifically, a shaft portion 92 of a flanged bolt (hereinafter, simply referred to as a "bolt") 90 is inserted into a through hole of one flat plate member 68A, a through hole of the extension portion 66A, a through hole of the extension portion 62A, and a through hole of the other flat plate member 68B in such an order substantially from the circumferential direction, and is screwed to the female screw portion 56A of the fixed-side block 56. As a result, the extension portion 62A and the extension portion 66A are attached in a state of being fixed to the transfer drum body 52.

Meanwhile, the other end portion in the circumferential direction of the base layer 62 is an extension portion 62B that extends further in the circumferential direction from the elastic layer 64. Plural bolt-inserting through holes (not illustrated) are formed at predetermined intervals in the axial direction of the transfer drum body 52 at a tip end of the extension portion 62B. The movable-side block 58 that extends toward the approximate center of the transfer drum body 52 (radially inward) in the side view is integrally provided at the other side edge portion (on the upstream side) in the recess 54 of the transfer drum body 52.

Here, the extension portion 62B is attached to the movable-side block 58 via an inner adjustment mechanism 70 that is capable of adjusting tension in the circumferential direction of the base layer 62. The axial direction of the transfer drum body 52 is a longitudinal direction of the inner adjustment mechanism 70. The inner adjustment mechanism 70 includes a pair of flat plate members 72 and a block member 74. The pair of flat plate members 72 sandwich the tip end of the extension portion 62B (a portion where the through holes are formed).

Figure 6:
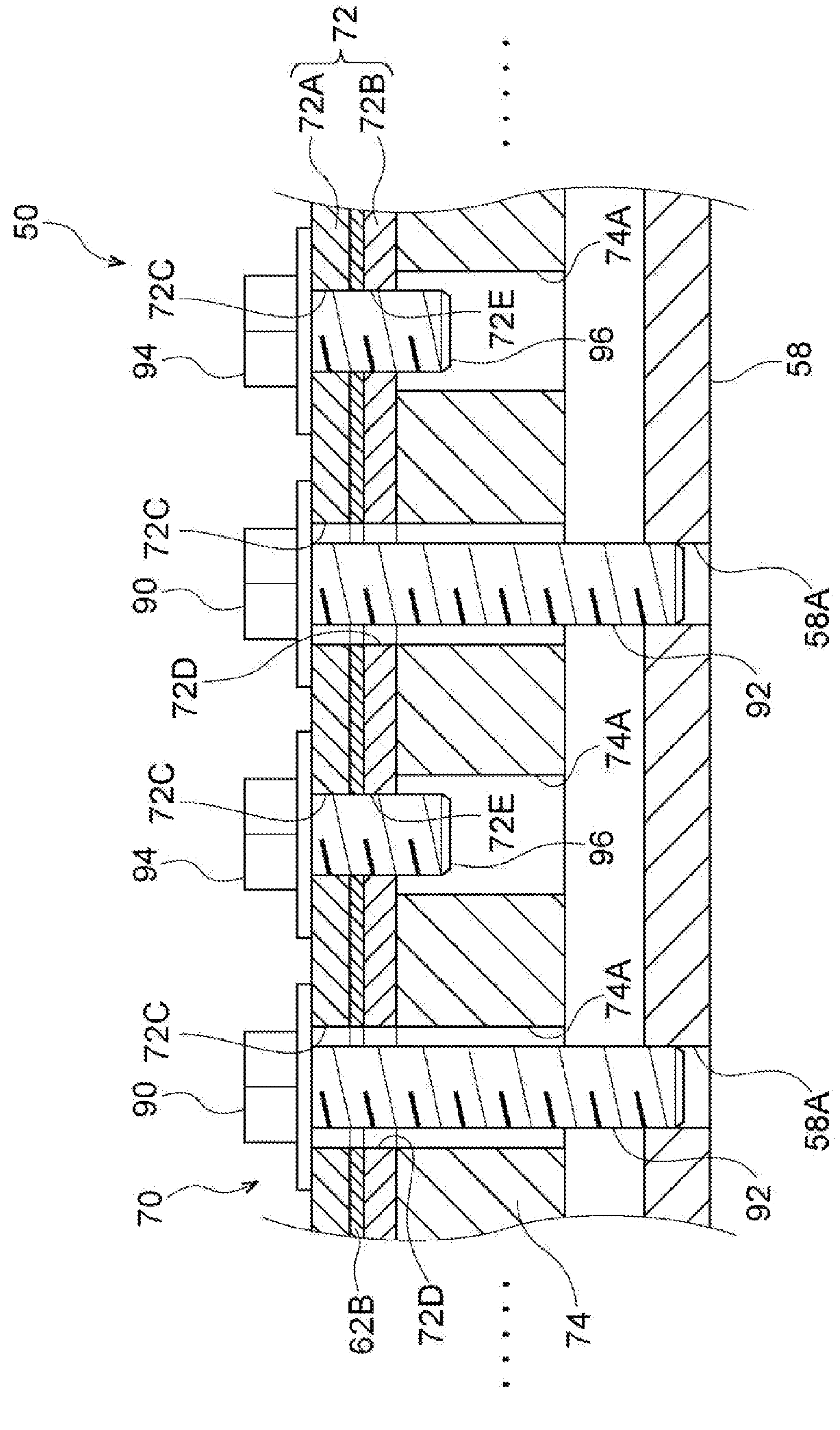
FIG. 6 is taken along line X-X of FIG. 5, illustrating an inner adjustment mechanism of the transfer drum according to the exemplary embodiment.

As illustrated in FIG. 6, in one flat plate member 72A, plural bolt-inserting through holes 72C are formed at predetermined intervals in the axial direction of the transfer drum body 52. In the other flat plate member 72B, plural bolt-inserting through holes 72D and female screw portions 72E are alternately formed at predetermined intervals in the axial direction of the transfer drum body 52. The other flat plate member 72B is integrally joined to the block member 74.

In the block member 74, plural bolt-inserting through holes 74A are formed at predetermined intervals in the axial direction of the transfer drum body 52. In a radially inner end portion of the movable-side block 58, plural female screw portions 58A are formed at predetermined intervals in the axial direction of the transfer drum body 52 with the radial direction serving as the axial direction.

Therefore, the extension portion 62B is bolted to the movable-side block 58 in the following manner such that the tension can be adjusted. The other flat plate member 72B is joined to the block member 74 in advance, and the through holes 72D and the female screw portions 72E of the other flat plate member 72B are aligned coaxially with the through holes 74A of the block member 74.

First, the portion of the tip end of the extension portion 62B where the through holes are formed is sandwiched between the one flat plate member 72A and the other flat plate member 72B. Shaft portions 96 of flanged bolts (hereinafter, simply referred to as "bolts") 94 that are shorter than the bolt 90 are inserted into every other through hole 72C of the one flat plate member 72A and every other through hole of the extension portion 62B, and are screwed to the female screw portions 72E of the other flat plate member 72B.

As a result, the extension portion 62B is attached to the pair of flat plate members 72, that is, the block member 74. A tip of the shaft portion 96 of each bolt 94 that is screwed to the female screw portion 72E and protrudes radially inward is configured to be inserted into the through hole 74A of the block member 74.

While the extension portion 62B is attached to the block member 74 in this way, the shaft portion 92 of the bolt 90 is sequentially inserted into a remaining through hole 72C of the one flat plate member 72A, a remaining through hole of the extension portion 62B, the through hole 72D of the other flat plate member 72B, and a remaining through hole 74A of the block member 74, and a male screw portion of the shaft portion 92 is screwed to the female screw portion 58A of the movable-side block 58.

As a result, the extension portion 62B is attached to the transfer drum body 52, and the tension in the circumferential direction of the base layer 62 relative to the transfer drum body 52 is adjusted to a predetermined value by adjusting an amount of displacement, namely an amount by which the shaft portion 92 of the bolt 90 is screwed into the movable-side block 58. Plural the bolts 90 are provided in the axial direction of the transfer drum body 52. Therefore, the tension in the circumferential direction of the base layer 62 relative to the transfer drum body 52 can correspond to outer diameter variation in the axial direction of the transfer drum body 52.

The other end portion in the circumferential direction of the surface layer 66 is an extension portion 66B that extends further in the circumferential direction from the elastic layer 64. Plural bolt-inserting through holes (not illustrated) are formed at predetermined intervals in the axial direction of the transfer drum body 52 at a tip end of the extension portion 66B. A bracket 76 that is substantially L-shaped in the side view and whose longitudinal direction is the axial direction of the transfer drum body 52 is integrally provided at a radially outer portion of the movable-side block 58 in the recess 54 of the transfer drum body 52.

Here, the extension portion 66B is attached to the bracket 76 of the movable-side block 58 via an outer adjustment mechanism 80 that is capable of adjusting tension in the circumferential direction of the surface layer 66. The outer adjustment mechanism 80 includes: a pair of flat plate members 82 whose longitudinal direction is the axial direction of the transfer drum body 52 and which sandwich the portion of the tip end of the extension portion 66B where the through holes are formed; and plural (for example, 15) compression coil springs 84 serving as an example of urging members that urge the pair of flat plate members 82 toward a flat plate-shaped support portion 78 of the bracket 76 with a predetermined urging force (for example, 10N).

Figure 7:
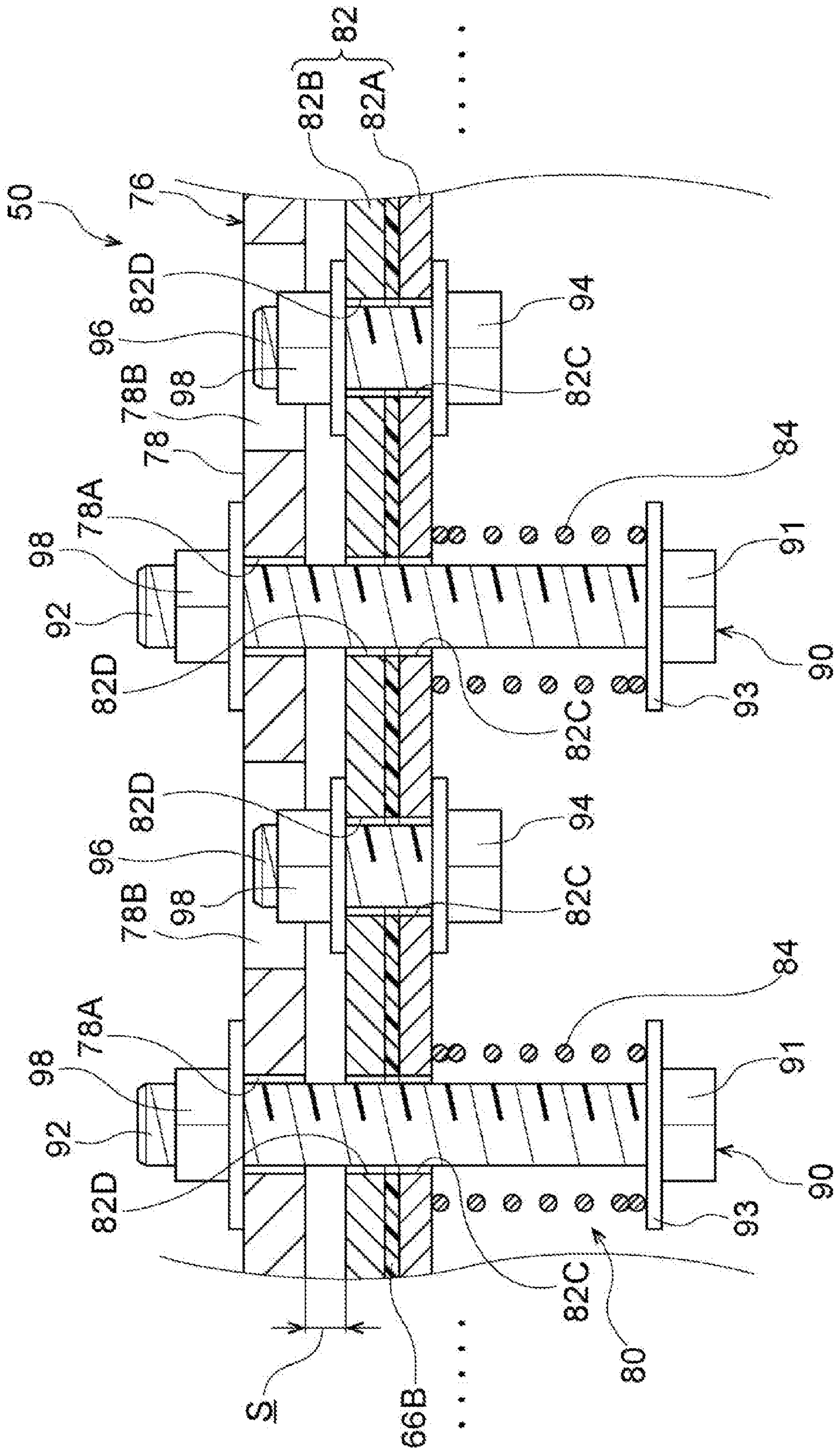
FIG. 7 is taken along line Y-Y of FIG. 5, illustrating an outer adjustment mechanism of the transfer drum according to the exemplary embodiment.

As illustrated in FIG. 5, one flat plate member 82A is formed in a substantially "L" shape in the side view. As illustrated in FIG. 7, plural bolt-inserting through holes 82C are formed in the flat plate member 82A at predetermined intervals in the axial direction of the transfer drum body 52. Plural bolt-inserting through holes 82D are formed in the other flat plate member 82B at predetermined intervals in the axial direction of the transfer drum body 52.

In the support portion 78 of the bracket 76, plural bolt-inserting through holes 78A and plural nut-inserting through holes 78B are alternately formed at predetermined intervals in the axial direction of the transfer drum body 52. Therefore, the extension portion 66B is bolted to the support portion 78 of the bracket 76 of the movable-side block 58 in the following manner such that the tension can be adjusted.

That is, first, the portion of the tip end of the extension portion 66B where the through holes are formed is sandwiched between the one flat plate member 82A and the other flat plate member 82B. The shaft portions 96 of the bolts 94 are sequentially inserted into every other through hole 82C of the one flat plate member 82A, every other through hole of the extension portion 66B, and every other through hole 82D of the other flat plate member 82B, and are screwed to flanged nuts (hereinafter, simply referred to as "nuts") 98 provided on the other flat plate member 82B. As a result, the extension portion 66B is attached to the pair of flat plate members 82. Each nut 98 is inserted and attached from the through hole 78B of the support portion 78.

In this way, the extension portion 66B is attached to the flat plate member 82, the compression coil spring 84 is fitted to the shaft portion 92, and the male screw portion of the shaft portion 92 of the bolt 90 that supports one end of the compression coil spring 84 by a flange 93 is sequentially inserted into a remaining through hole 82C of the one flat plate member 82A, a remaining through hole of the extension portion 66B, a remaining through hole 82D of the other flat plate member 82B, and the through hole 78A of the support portion 78, and is screwed to the nut 98 provided on the side of the support portion 78.

Then, the other end of the compression coil spring 84 is supported by the one flat plate member 82A, and the compression coil spring 84 is held in a compressed state between the flat plate member 82A and the flange 93 of the bolt 90. As a result, the extension portion 66B is always attached to the transfer drum body 52 with constant tension (that is, with a constant load) provided by the urging force of the compression coil spring 84. Therefore, it can be said that the outer adjustment mechanism 80 is a constant load adjustment mechanism.

By adjusting an amount by which the shaft portion 92 of the bolt 90 is screwed into the nut 98, the urging force (constant load) of the compression coil spring 84 can be adjusted. A tip of the shaft portion 96 of the bolt 94 that is screwed to the nut 98 and protrudes substantially in the circumferential direction can be inserted into the through hole 78B of the support portion 78 together with the nut 98. Further, as illustrated in FIG. 5, a head portion 91 of the bolt 90 is not in contact with the extension portion 62B of the base layer 62.

The plural bolts 90 are provided in the axial direction of the transfer drum body 52. Therefore, the tension in the circumferential direction of the surface layer 66 relative to the transfer drum body 52 can correspond to the outer diameter variation in the axial direction of the transfer drum body 52.

A movable amount of the pair of flat plate members 82 (that is, an adjustment distance of the constant load) is configured to be larger than a change amount of an outer diameter of the elastic layer 64. That is, even if the flat plate member 82 moves in the axial direction of the bolt 90, a gap S (see FIG. 7) is always secured between the other flat plate member 82B and the support portion 78 such that the flat plate member 82B and the support portion 78 do not come into contact with each other.

In this way, both ends in circumferential directions of the base layer 62 and the surface layer 66 are accommodated in the recess 54 of the transfer drum body 52, and are attached by bolt fastening. Therefore, the inner adjustment mechanism 70, the outer adjustment mechanism 80, and the like do not interfere with conveyance of the recording sheet P, and the transfer member 60 can be replaced with respect to the transfer drum body 52.

Next, an operation of the transfer member 60, the transfer drum 50, and the image forming apparatus 10 configured as described above will be described in detail.

As described above, the recording sheet P sent out from the accommodating unit 14 is conveyed toward the transfer drum 50 by the first conveyance unit 44. The transfer drum 50 is driven to rotate in the direction of arrow B illustrated in the drawings. The transfer drum 50 grips the downstream side tip of the recording sheet P conveyed by the first conveyance unit 44 with the grippers, conveys the recording sheet P to the secondary transfer position T2 (nip region Np) while rotating, and transfers the toner image from the transfer belt 42 to the recording sheet P.

That is, when the toner image is transferred from the transfer belt 42 to the recording sheet P, the transfer drum 50 sandwiches the recording sheet P with a predetermined pressure between the surface layer 66 and the outer circumferential surface of the transfer belt 42 and passes the recording sheet P through the nip region Np. Therefore, in the nip region Np, the surface layer 66 and the elastic layer 64 of the transfer member 60 of the transfer drum 50 are rotated while being squeezed (that is, while being elastically deformed) by the backup roller 38 via the transfer belt 42.

Here, the base layer 62 is wound around the transfer drum body 52 in a state where the elastic layer 64 is adhered in advance. Therefore, as compared to a case where the elastic layer 64 is not adhered to the base layer 62, in other words, a case where the base layer 62 is wound around the transfer drum body 52 and then the elastic layer 64 is wound around the base layer 62 in a non-adhesive manner, ease of attaching and detaching the base layer 62 and the elastic layer 64 to and from the transfer drum body 52 (that is, ease of replacing the transfer member 60) is improved. The hardness of the base layer 62 is higher than the hardness of the elastic layer 64 (the hardness of the elastic layer 64 is lower than the hardness of the base layer 62). Therefore, as compared with a case where the elastic layer 64 is directly adhered to and wound around the transfer drum body 52, tension variation in the circumferential direction of the elastic layer 64 is reduced due to the base layer 62 that has high hardness. Therefore, occurrence of image quality defects caused by such tension variation is prevented.

The volume resistivity of the base layer 62 is smaller than the volume resistivity of the elastic layer 64. Therefore, conductivity between the transfer drum body 52 and the base layer 62 can be easily secured as compared with a case where the volume resistivity of the base layer 62 is equal to or larger than the volume resistivity of the elastic layer 64. When the base layer 62 is made of stainless steel, corrosion resistance is excellent and corrosion is less likely to occur as compared with a case where the base layer 62 is made of a metal material other than stainless steel.

The thickness of the base layer 62 is smaller (thinner) than the thickness of the elastic layer 64 (the thickness of the elastic layer 64 is larger (thicker) than the thickness of the base layer 62). Therefore, as compared with a case where the thickness of the base layer 62 is equal to or thicker than the thickness of the elastic layer 64, even the base layer 62 that has high hardness can be easily wound around the transfer drum body 52, and thus the ease of replacing the transfer member 60 is improved.

The both end portions in the circumferential directions of the base layer 62, that is, the extension portion 62A and the extension portion 62B extend further in the circumferential directions from both end portions in the circumferential direction of the elastic layer 64 such that a predetermined length can be accommodated in the recess 54. Therefore, as compared with a case where both end portions in the circumferential directions of the base layer 62 are shorter than the both end portions in the circumferential directions of the elastic layer 64, the transfer member 60 is easily attached to the transfer drum body 52, and thus the ease of attaching and detaching the base layer 62 to and from the transfer drum body 52 (the ease of replacing the transfer member 60) is improved.

Since the extension portion 62A and the extension portion 62B of the base layer 62 are accommodated in the recess 54, the transfer member 60 can be attached to the transfer drum body 52 without causing the portions to which the extension portion 62A and the extension portion 62B are attached (that is, the fixed-side block 56 and the movable-side block 58) to protrude from an outer circumferential surface of the transfer drum 50.

The surface layer 66 is provided on the outer circumferential surface of the elastic layer 64. That is, the elastic layer 64 is between the base layer 62 and the surface layer 66. Therefore, deterioration of the elastic layer 64 is prevented as compared with a case where the outer circumferential surface of the elastic layer 64 is exposed to outside. As compared with a case where the elastic layer 64 is not provided between the base layer 62 and the surface layer 66, the nip region Np is easily secured at the time of secondary transfer.

In particular, when the elastic layer 64 is made of foamed rubber, the nip region Np is more easily secured. In general, foam rubber has poor adhesion. However, in the exemplary embodiment, since foam rubber is adhered to the base layer 62 in advance, it is possible to wind the elastic layer 64 around the transfer drum body 52 even though the elastic layer 64 is foam rubber.

As described above, the base layer 62 is wound around the transfer drum body 52 in the state where the elastic layer 64 is adhered in advance. Therefore, as compared to the case where the elastic layer 64 is not adhered to the base layer 62, in other words, the case where the base layer 62 is wound around the transfer drum body 52 and then the elastic layer 64 is wound around the base layer 62 in the non-adhesive manner, the ease of attaching and detaching the base layer 62 and the elastic layer 64 to and from the transfer drum body 52 (that is, the ease of replacing the transfer member 60) is improved.

The extension portion 62A in the circumferential direction of the base layer 62 is fixed to the transfer drum body 52, and the extension portion 62B in the circumferential direction is attached to the transfer drum body 52 via the inner adjustment mechanism 70 capable of adjusting the tension relative to the transfer drum body 52. Therefore, the base layer 62 can be wound around the transfer drum body 52 with desired tension in accordance with outer diameter variation of each transfer drum body 52.

In addition, plural the inner adjustment mechanisms 70 are provided in the axial direction of the transfer drum body 52. Therefore, the base layer 62 can be wound around the transfer drum body 52 with desired tension in accordance with the outer diameter variation in the axial direction of the transfer drum body 52.

The both end portions in the circumferential directions of the surface layer 66, that is, the extension portion 66A and the extension portion 66B extend further in the circumferential directions from the both end portions in the circumferential directions of the elastic layer 64 such that a predetermined length can be accommodated in the recess 54. Therefore, as compared with a case where both ends in the circumferential directions of the surface layer 66 are shorter than both end portions of the circumferential directions of the elastic layer 64, even if the elastic layer 64 is distorted (that is, deformed) at the time of secondary transfer (that is, at the time of rotation while being squeezed by the backup roller 38), air is less likely to enter between the elastic layer 64 and the surface layer 66, and gaps are less likely to be formed. In addition, both end portions in the circumferential directions of the elastic layer 64 are not attached to the transfer drum body 52, and the extension portion 66A and the extension portion 66B that are both end portions in the circumferential directions of the surface layer 66 are attached to the transfer drum body 52. Therefore, as compared with a case where both end portions of the circumferential directions of the elastic layer 64 are attached to the transfer drum body 52, the elastic layer 64 and the surface layer 66 easily move relative to each other in the circumferential direction at the time of secondary transfer (that is, when being squeezed by the backup roller 38), and gaps are less likely to be formed between the elastic layer 64 and the surface layer 66.

Further, the inner circumferential surface of the surface layer 66 is not adhered to the outer circumferential surface of the elastic layer 64. That is, the surface layer 66 is not adhered to the elastic layer 64. Therefore, as compared with a case where the inner circumferential surface of the surface layer 66 is adhered to the outer circumferential surface of the elastic layer 64, even if the elastic layer 64 is distorted (that is, deformed) in the nip region Np that is squeezed by the backup roller 38 at the time of secondary transfer, the elastic layer 64 and the surface layer 66 can move relative to each other in the circumferential direction, and thus gaps are less likely to be formed between the elastic layer 64 and the surface layer 66.

The extension portion 66A in the circumferential direction of the surface layer 66 is fixed to the transfer drum body 52, and the extension portion 66B in the circumferential direction is attached to the transfer drum body 52 via the outer adjustment mechanism 80 capable of adjusting the tension relative to the transfer drum body 52. Therefore, as compared with a case where the extension portion 66B of the surface layer 66 is also fixed to the transfer drum body 52, the elastic layer 64 and the surface layer 66 can be rapidly moved relative to each other in the circumferential direction at the time of secondary transfer (that is, when being squeezed by the backup roller 38), and thus gaps are less likely to be formed between the elastic layer 64 and the surface layer 66.

The outer adjustment mechanism 80 is also a constant load adjustment mechanism including the compression coil springs 84 that urge the surface layer 66 toward the upstream side in the rotation direction of the transfer drum body 52. That is, the surface layer 66 is always wound around the elastic layer 64 in a state of being pulled toward the upstream side in the rotation direction of the transfer drum body 52. Therefore, it is possible to cause the surface layer 66 to follow deformation of the elastic layer 64 caused by aging deterioration at the time of secondary transfer (that is, when being squeezed by the backup roller 38).

In addition, plural the outer adjustment mechanisms 80 that is an example of the constant load adjustment mechanism are provided in the axial direction of the transfer drum body 52. Therefore, it is also possible to cause the surface layer 66 to follow axial direction deformation of the elastic layer 64 caused by aging deterioration at the time of secondary transfer (that is, when being squeezed by the backup roller 38). Therefore, at the time of secondary transfer (that is, when being elastically deformed by the backup roller 38), gaps are less likely to be formed between the elastic layer 64 and the surface layer 66.

Therefore, at the time of secondary transfer (that is, when being squeezed by the backup roller 38), gaps are less likely to be formed between the elastic layer 64 and the surface layer 66. That is, according to the image forming apparatus 10 including the transfer drum 50 according to the exemplary embodiment, occurrence of image quality defects caused by gap formation between the elastic layer 64 and the surface layer 66 at the time of secondary transfer is more effectively prevented.

Both end portions in the circumferential directions of the base layer 62, that is, the extension portion 62A and the extension portion 62B also extend further in the circumferential direction from both end portions in the circumferential directions of the elastic layer 64 such that the predetermined length can be accommodated in the recess 54. Therefore, as compared with the case where both end portions in the circumferential directions of the base layer 62 are shorter than both end portions in the circumferential directions of the elastic layer 64, the transfer member 60 is easily attached to the transfer drum body 52, and thus the ease of attaching and detaching the base layer 62 to and from the transfer drum body 52 (the ease of replacing the transfer member 60) is improved.

Although the transfer member 60, the transfer drum 50, and the image forming apparatus 10 according to the exemplary embodiment have been described above with reference to the drawings, the transfer member 60, the transfer drum 50, and the image forming apparatus 10 according to the exemplary embodiment are not limited to those illustrated in the drawings, and may be appropriately modified in design without departing from the scope of the present invention.

For example, the transfer drum body 52 is not limited to have the substantially cylindrical shape, and may be formed in a substantially columnar shape. The base layer 62 is not limited to be the metal layer made of a metal material such as stainless steel, and may also be a resin layer made of a resin material such as polyimide, polycarbonate, polyethylene terephthalate, or solid rubber.

Although the extension portion 62A of the base layer 62 is fixed to the transfer drum body 52 (the fixed-side block 56) while the extension portion 62B is attached to the transfer drum body 52 (the movable-side block 58) via the inner adjustment mechanism 70, the present invention is not limited thereto. For example, the extension portion 62A and the extension portion 62B of the base layer 62 may both be attached to the transfer drum body 52 via the inner adjustment mechanism 70.

Although the surface layer 66 is provided on the transfer member 60, the elastic layer 64 may also be adhered to the base layer 62 without providing the surface layer 66. Here, although the elastic layer 64 is adhered by an adhesive, an adhering method thereof is not limited thereto. For example, the elastic layer 64 may be adhered by thermally melting between the base layer 62 and the elastic layer 64.

The transfer member 60 may be circulated in a state where the pair of flat plate members 68 are attached to the extension portion 62A and the extension portion 66A in advance. The transfer member 60 may be circulated in a state where the pair of flat plate members 82 are attached to the extension portion 66B in advance. The transfer member 60 may be circulated in a state where the pair of flat plate members 72 are attached to the extension portion 62B in advance. It is also possible to attach the transfer member 60 to the transfer drum 52 by an operator in fewer steps as compared with a case where the transfer member 60 is circulated in a state where the pairs of flat plate members 68, 72, and 82 are separated from the transfer member 60.

Although the toner image is exemplified as an example of the image, and here, the toner image formed by a dry electrophotographic method is used, the image is not limited thereto. For example, the image may be a toner image formed by a wet electrophotographic method or an image formed by an ink jet method.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transfer member comprising:

an inner layer wound around a transfer drum body in a non-adhesive state;

an outer layer provided on an outer periphery of the inner layer in an adhesive state; and a surface layer provided on an outer periphery of the outer layer, both end portions of the surface layer in circumferential directions extending in the circumferential directions beyond both end portions of the outer layer in the circumferential directions, wherein the inner layer and has a hardness higher than a hardness of the outer layer, and wherein both end portions of the inner layer in the circumferential directions extend in the circumferential directions beyond both end portions of the outer layer in the circumferential directions.

2. The transfer member according to claim 1, wherein volume resistivity of the inner layer is smaller than volume resistivity of the outer layer.

3. The transfer member according to claim 2, wherein the inner layer is made of stainless steel.

4. The transfer member according to claim 1, wherein a thickness of the inner layer is smaller than a thickness of the outer layer.

5. The transfer member according to claim 2, wherein a thickness of the inner layer is smaller than a thickness of the outer layer.

6. The transfer member according to claim 3, wherein a thickness of the inner layer is smaller than a thickness of the outer layer.

7. The transfer member according to claim 1, wherein the surface layer is not adhered to the outer layer.

8. The transfer member according to claim 1, wherein the outer layer is an elastic layer.

9. The transfer member according to claim 8, wherein the elastic layer is foamed rubber.

10. A transfer drum comprising:

a transfer drum body having a single recess along an axial direction on a circumferential surface of the transfer drum body; and the transfer member according to claim 1, the transfer member being wound around the transfer drum body, wherein both end portions of the inner layer in circumferential directions are accommodated in the recess.

11. The transfer drum according to claim 10, further comprising an inner adjustment mechanism provided in the recess, the inner adjustment mechanism configured to adjust tension of the inner layer.

12. The transfer drum according to claim 11, comprising a plurality of the inner adjustment mechanisms provided in the axial direction of the transfer drum body.

13. An image forming apparatus comprising:

the transfer drum according to claim 10 configured to convey a recording medium; and an intermediate transfer body configured to transfer an image to the recording medium conveyed by the transfer drum.

* * * * *